(12) United States Patent
Köllensperger et al.

(10) Patent No.: US 11,677,311 B2
(45) Date of Patent: Jun. 13, 2023

(54) CONVERTER WITH ACTIVE DAMPING OF THE INTERMEDIATE CIRCUIT VOLTAGE

(71) Applicant: Siemens Aktiengesellschaft, Munich (DE)

(72) Inventors: Peter Köllensperger, Heroldsberg (DE); Stephan Neugebauer, Erlangen (DE)

(73) Assignee: SIEMENS AKTIENGESELLSCHAFT, Munich (DE)

(*) Notice: Subject to any disclaimer, the term of this patent is extended or adjusted under 35 U.S.C. 154(b) by 0 days.

(21) Appl. No.: 17/763,100

(22) PCT Filed: Aug. 18, 2020

(86) PCT No.: PCT/EP2020/073080
§ 371 (c)(1),
(2) Date: Mar. 23, 2022

(87) PCT Pub. No.: WO2021/058199
PCT Pub. Date: Apr. 1, 2021

(65) Prior Publication Data
US 2022/0352809 A1    Nov. 3, 2022

(30) Foreign Application Priority Data
Sep. 27, 2019 (EP) .................... 19200073

(51) Int. Cl.
*H02M 7/5388* (2007.01)
*H02M 1/15* (2006.01)
(Continued)

(52) U.S. Cl.
CPC .......... *H02M 1/15* (2013.01); *H02M 7/4803* (2021.05); *H02P 29/50* (2016.02); *H02M 5/458* (2013.01);
(Continued)

(58) Field of Classification Search
CPC .......... H02M 1/14; H02M 1/15; H02M 5/453; H02M 5/458; H02M 7/48; H02M 7/4803;
(Continued)

(56) References Cited

U.S. PATENT DOCUMENTS 7,113,414 B2 * 9/2006 Matsushiro ........... H02M 5/458
318/801
8,982,587 B2 * 3/2015 Nguyen .............. H02M 7/4833
363/39
(Continued)

FOREIGN PATENT DOCUMENTS

DE    102011013247 A1    3/2012
EP        2284986 A1      2/2011
(Continued)

OTHER PUBLICATIONS

Cascone et al; "Design of active filters for dynamic damping of harmonic currents generated by asynchronous drives in modern high power locomotives"; Proceedings of the annual power electronics specialists conference (PESC). Toledo, IEEE; Bd. 23; pp. 404-410; ISBN: 978-0-7803-0695-0; DOI: 10.1109/PESC.1992.254852; XP010064887; 1992.
(Continued)

*Primary Examiner* — Gary L Laxton
(74) *Attorney, Agent, or Firm* — Henry M. Feiereisen LLC

(57) ABSTRACT

In a method for operating a controllable converter with an intermediate circuit capacitor, the control behavior can be improved by transmitting, depending on an intermediate circuit voltage applied to the intermediate circuit capacitor, an additional power component via the controllable converter such that the electric current that is generated by the controllable converter for the additional power component counteracts an oscillation of the intermediate circuit voltage. The additional power component is transmitted by the
(Continued)

controllable converter to a connected motor as a pulsating additional torque. Also described is a controllable converter with a control unit for carrying out a method, wherein the controllable converter has semiconductors that can be switched off, and an intermediate circuit capacitor designed as a film-type capacitor.

6 Claims, 2 Drawing Sheets

(51) Int. Cl.
*H02P 29/50* (2016.01)
*H02M 7/48* (2007.01)
*H02M 5/458* (2006.01)
*H02M 7/5387* (2007.01)
*H02M 7/5395* (2006.01)

(52) U.S. Cl.
CPC ........ *H02M 7/4826* (2013.01); *H02M 7/5387* (2013.01); *H02M 7/5395* (2013.01)

(58) Field of Classification Search
CPC ............. H02M 7/4826; H02M 7/5387; H02M 7/5395; H02P 29/50
See application file for complete search history.

(56) References Cited

U.S. PATENT DOCUMENTS

| 9,882,466 | B2* | 1/2018 | Kondo ................ H02M 1/0085 |
| 10,291,174 | B2* | 5/2019 | Irie ........................ B60L 15/007 |
| 2002/0093836 | A1* | 7/2002 | Goepfrich ............... H02P 29/50 |
| | | | 363/16 |
| 2012/0194110 | A1 | 8/2012 | Konig et al. |
| 2013/0300334 | A1 | 11/2013 | Tooyama et al. |
| 2014/0247003 | A1 | 9/2014 | Yamasaki et al. |
| 2015/0180356 | A1 | 6/2015 | Norisada et al. |
| 2018/0191286 | A1 | 7/2018 | Lee et al. |
| 2018/0331645 | A1 | 11/2018 | Aoki et al. |
| 2020/0412292 | A1* | 12/2020 | Hayashi .................. H02P 21/05 |

FOREIGN PATENT DOCUMENTS

| EP | 2 482 442 A1 | 8/2012 |
| EP | 2 667 503 A1 | 11/2013 |
| EP | 3 343 742 A1 | 7/2018 |
| WO | WO 2019-179621 A | 9/2019 |

OTHER PUBLICATIONS

PCT International Search Report and Written Opinion of International Searching Authority dated Jun. 11, 2021 corresponding to PCT International Application No. PCT/EP2020/073080 filed Aug. 18, 2020.

* cited by examiner

CONVERTER WITH ACTIVE DAMPING OF THE INTERMEDIATE CIRCUIT VOLTAGE

CROSS-REFERENCES TO RELATED APPLICATIONS

This application is the U.S. National Stage of International Application No. PCT/EP2020/073080, filed Aug. 18, 2020, which designated the United States and has been published as International Publication No, WO 2021/058199 A1 and which claims the priority of European Patent Application, Serial No, 19200073.5, filed Sep. 27, 2019, pursuant to 35 U.S.C. 119(a)-(d).

BACKGROUND OF THE INVENTION

The invention relates to a method for operating a controllable converter with an intermediate circuit capacitor. The invention further relates to a controllable converter with a regulating unit for carrying out a method of this kind, wherein the controllable converter has semiconductors that can be switched off and an intermediate circuit capacitor.

A controllable converter with an intermediate circuit capacitor is used to convert a DC voltage at the input of the converter present at the intermediate circuit and thus also at the intermediate circuit capacitor into an AC voltage with a predeterminable amplitude and a predeterminable frequency. For this purpose, the controllable converter uses switchable semiconductors, in particular semiconductors that can be switched off.

In this case, a DC voltage is substantially present at the intermediate circuit capacitor. However, this DC voltage can, for example, be superimposed by an AC voltage due to an unbalanced load or an unbalanced power supply network. This AC voltage is particularly troublesome if it excites resonance, since it can then result in an impermissible load on components or the regulation of the converter is disrupted. Both of these can lead to the destruction of components or a malfunction in the operation of the converter or an installation constructed therefrom, such as, for example, a drive system.

In contrast to a controllable converter, there are also uncontrolled converters such as, for example, a B2 or B6 diode bridge, capable of converting AC voltage into DC voltage without control or regulation.

The invention is based on the object of improving a controllable converter, in particular with regard to its operating behavior,

SUMMARY OF THE INVENTION

This object is by a method for operating a controllable converter with an intermediate circuit capacitor, wherein an additional power component is transmitted via the controllable converter in dependence on an intermediate circuit voltage applied to the intermediate circuit capacitor in such a way that the electric current produced for the additional power component counteracts oscillation of the intermediate circuit voltage by means of the controllable converter, wherein the additional power component is transmitted to the motor in the form of a pulsating additional torque by means of the controllable converter. The object is further achieved by a controllable converter with a regulating unit configured to carry out a method of this kind, wherein the controllable converter has semiconductors that can be switched off and an intermediate circuit capacitor, wherein the intermediate circuit capacitor is embodied as a film capacitor.

Further advantageous embodiments of the invention are disclosed in the dependent claims.

The invention is based on the knowledge that the operation of a converter can be improved by eliminating oscillations in the intermediate circuit of the power converter by transmitting an additional power component via the converter which counteracts the oscillation of the intermediate circuit voltage. These oscillations can, for example, arise as a result of resonance points that are, for example, excited by the operation of the converter. The resonance points are usually damped by means of resistances in order to prevent excessive voltage fluctuations. However, these resistances increase the losses of the converter, The resistances can, for example, be introduced into the system by parasitic ohmic losses of the intermediate circuit capacitor. The use of the method according to the invention enables the damping in the converter to be reduced and thus the losses of the converter are reduced. The operation of the converter is more favorable due to the higher efficiency The additional power component transmitted via the converter creates a current in the intermediate circuit of the converter. This current, multiplied by the intermediate circuit voltage, results in the additional instantaneous power that is transmitted via the converter. This additional instantaneous power is referred to as the additional power component. It is selected in such a way that the resulting current counteracts fluctuation of the capacitor voltage via the known relationship at the capacitor $$i = C \cdot \dot{u}.$$

Hence, counteraction takes place by way of the semiconductors of the converter as an active element for damping by impressing a corresponding instantaneous power. A passive element, which is thus rigid in terms of its flexibility, such as, for example, a resistance or resistive bar element is not required.

A constant DC voltage at the intermediate circuit is important for good regulation/control of the converter. Oscillations in the intermediate circuit voltage often lead to imprecise regulation behavior of the converter. Setpoints such as voltage, frequency at the AC voltage side connections of the converter and torque or speed of a motor connected to the converter can then no longer be maintained exactly. Hence, the method according to the invention enables setpoints at the converter or at components connected to the converter, such as, for example, a motor or a power supply network, to be maintained precisely as actual values. There is only a small deviation in regulation.

Furthermore, the method according to the invention has the advantage that it can be easily adapted to the respective conditions of use. The adaptation, for example, based on the existing resonant frequency, can take place in a simple manner in the regulating software. No hardware modifications are required. Hence, the converter can be easily and cost-effectively adapted to its technical environment. Adaptation to other combinations/embodiments of power modules of the converter is not necessary or only necessary by software parameterization. Passive elements such as, for example, resistances or a resistive bulbar must always be designed individually to take account of the technical environment. Furthermore, this software-based method offers the possibility of dynamic adaptation to varying mains conditions, (impedances in the motor and/or power supply network).

In other words, the advantage of the method is that an active concept is used to damp an intermediate circuit voltage oscillation. In this case, the basic idea is to identify resonant oscillations based on a determination of the intermediate circuit voltage and to dissipate the energy from the intermediate circuit with the aid of a suitable additional torque.

In this case, the controllable converter is connected to a motor, wherein the additional power component is transmitted to the motor in the form of a pulsating additional torque by means of the controllable converter. A particularly positive application of the method is obtained with an electric drive system comprising a motor. In this case, the motor is supplied with electrical energy by means of the converter and in this case can be controlled or regulated in such a way that the additional power component is transmitted to the motor in the form of an additional torque. The additional torque transmitted by the additional power component is small compared to the desired torque on the motor so that the converter can transmit this additional power component to the motor as torque without causing any significant disadvantages during operation. Thus, the intermediate circuit voltage can be smoothed in a simple manner, while the behavior of the electrical drive system does not deteriorate noticeably. Furthermore, due to the absence of resistances, there are no increased losses in the motor, so that the electrical drive system is highly efficient and has low operating costs.

In one advantageous embodiment of the invention, the intermediate circuit capacitor is embodied as a film capacitor. The method according to the invention enables resonance phenomena to be counteracted more effectively and at the same time stable and reliable regulation of the converter to be implemented. As a result, the resonance points require significantly less damping by means of a passive component, such as, for example, a resistance. Therefore, it is also possible to use a film capacitor in the intermediate circuit for a converter with regulation of this kind. This film capacitor has much lower parasitic resistance than the electrolytic capacitor that is widely used today. In this case, the resistance, also referred to as ESR, has a value of 1 mΩ to 1.5 mΩ for a film capacitor with a capacitance of 1 mF. Hence, the ESR of an intermediate circuit capacitor constructed from a parallel circuit of a plurality of film capacitors is about 50 μΩ to 75 μΩ for a capacitance of 20 mF. These values are in each case related to low-voltage applications (<1000 V). Negative impacts, such as voltage fluctuations or damage to/destruction of components due to the then much less damped resonance points can be prevented with the method according to the invention, wherein, at the same time, the converter becomes more efficient due to lower losses. This then also has a positive impact on the converter's operating costs. In other words, the application of the method enables the use of inexpensive and lower-loss film capacitors.

In a further advantageous embodiment of the invention, the nominal voltage of the controllable converter is less than or equal to 1000 V, in particular equal to 400 V. This class of converter is also referred to as low voltage. Due to the significantly larger capacitances present compared to medium-voltage applications and significantly larger mains or motor inductances, resonance phenomena are already present in a frequency range between 100 Hz and 300 Hz, while they are significantly higher in medium-voltage applications. To make matters worse, excitations are also particularly high in low-voltage applications and can trigger resonance effects. To date, this has made the application of film capacitors difficult, if not impossible, at least without the provision of further measures such as lossy damping. On the other hand, the application of the method now also enables low-voltage applications, in particular converters with a nominal voltage of 400 V, to be operated reliably and with low losses using film capacitors, If there are two controllable converters, a first controllable converter between the power supply network and the intermediate circuit and a second controllable converter between the intermediate circuit and the motor, both converters can be used for damping intermediate circuit voltage fluctuations. This further reduces the impacts on the power supply network and motor compared to an application with only one controllable converter. In this case, the division can, for example, be made on the basis of applicable regulations for connection to the power supply network or requirements for the behavior of the load.

In a further advantageous embodiment of the invention, the additional power component is only transmitted if a periodic oscillation of the intermediate circuit voltage is detected and this periodic oscillation is within a predetermined frequency range. The oscillations can be evaluated as to whether they are problematic for regulation control, for example, since, as a resonance point, they have only little damping and/or do not influence the behavior of the converter or only influence it insignificantly. In the case of oscillations, which do not influence the controllable converter or only influence it insignificantly, there is no need to eliminate the oscillations. The control reserve of the regulator or controller then becomes exclusive for the actual task, such as, for example, controlling the speed or torque of a drive system, and is focused on the disruptive oscillations in the drive system. This makes it possible to react quickly to disruptive oscillations, since they can be detected more easily and quickly in a limited frequency range. As a result, the regulation is particularly stable and endows the drive system with a high degree of robustness and reliability with respect to external interference.

In a further advantageous embodiment of the invention, the controllable converter is part of a drive system, wherein the drive system has a power supply network, in particular the aforementioned power supply network, and/or a motor, in particular the aforementioned motor, wherein the predetermined frequency range comprises a resonant frequency from the intermediate circuit capacitor and mains impedance of the power supply network and/or from the intermediate circuit capacitor and motor inductance of the motor. Resonance phenomena occur in many drive systems due to the existing mains inductances, the motor inductances and the capacitance of the intermediate circuit capacitor required for the operation of the controllable converter, in particular in a frequency range between 100 Hz and 300 Hz. The method enables these to be damped in a particularly simple manner, In this case, it has been found that the method does not exceed the permissible system perturbations for the operation of drives. At the same time, the additional torque that results from the method when the controllable converter supplies power to the motor does not have a negative impact on the motor's drive function. Therefore, the use of the method for an electric drive that provides a controllable converter for connection to a power supply network and/or a converter for connecting the intermediate circuit to a motor is particularly advantageous. Thus, an inexpensive drive can be constructed with one or more film capacitors instead of electrolytic capacitors and, as already described above, operated at low cost.

In a further advantageous embodiment of the invention, the intermediate circuit voltage at the intermediate circuit capacitor and/or the current through the intermediate circuit capacitor is measured to identify the periodic oscillation of the intermediate circuit voltage. Oscillation can be identified in different ways. The voltage at the intermediate circuit capacitor can be measured in a simple manner. Alternatively or additionally, it is also possible to measure the current through the intermediate circuit capacitor and to determine the voltage at the intermediate circuit capacitor therefrom. Furthermore, it is also alternatively or additionally possible to determine the voltage at the intermediate circuit capacitor by calculation, in particular on the basis of a calculation model, from knowledge of the converter behavior and other variables such as, for example, mains voltage and/or mains currents of the power supply network or also from motor currents, and thus to detect oscillations.

In other words, instead of measuring the intermediate circuit voltage, it is also possible to use the current into the capacitor or the current of the converter intended for connection to the power supply network or to the motor as an input variable for the filter or the regulator.

In a further advantageous embodiment of the invention, the measured values of the intermediate circuit voltage and/or current are filtered by the intermediate circuit capacitor. Thus, it is simple to restrict the method to specific frequency ranges. Furthermore, it is particularly advantageous, especially with use in an electric drive system, to ignore oscillations that occur due to an uncontrolled converter such as, for example, a B2 diode bridge or B6 diode bridge, when eliminating oscillations, i.e. to ignore oscillations that occur due to an uncontrolled converter such as, for example, a 82 diode bridge or 86 diode bridge when eliminating oscillations since they are inherently present and can be tolerated. Elimination would require too large a regulation reserve for the controllable converter. Since, at the same time, the uncontrolled converter enables the drive system to be produced particularly inexpensively, the combination of controllable and uncontrolled converters in a drive with a method for eliminating oscillations outside twice or six times the main frequency and its multiples, such as occur with the use of diode bridges, enables the production of a particularly good, inexpensive, and reliable drive system.

BRIEF DESCRIPTION OF THE DRAWING

The following describes and explains the invention in more detail with reference to the exemplary embodiments depicted in the figures, in which.

DETAILED DESCRIPTION OF PREFERRED EMBODIMENTS

Figure 1:
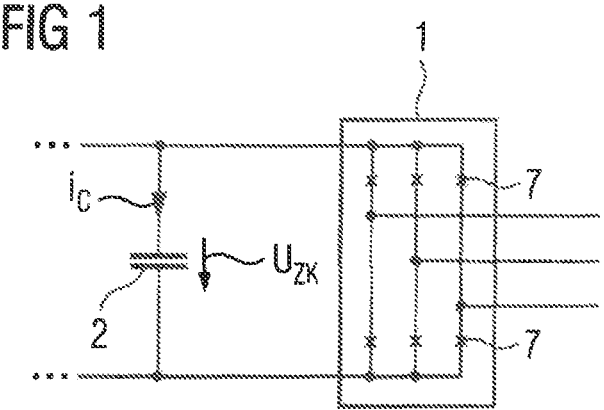
FIG. 1 shows a converter with a voltage intermediate circuit.

FIG. 1 shows a controllable converter 1 with an intermediate circuit capacitor 2. In this case, the controllable converter 1 converts a voltage $U_{ZK}$, which is applied to the intermediate circuit capacitor 2, into an AC voltage, which is applied to the three outputs of the controllable converter 1. For this purpose, the controllable converter 1 uses semiconductors 7, which are switched accordingly. The capacitor current $i_C$ flows through the intermediate circuit capacitor 2.

Depending upon the set voltages, power is transmitted via the converter 1. In this case, in addition to the power desired for operation, which, for example, causes a torque on a motor not shown here, an additional power component can be transmitted, which causes a current $i_C$ through the intermediate circuit capacitor 2 and counteracts a fluctuation present in the intermediate circuit voltage $U_{ZK}$.

Figure 2:
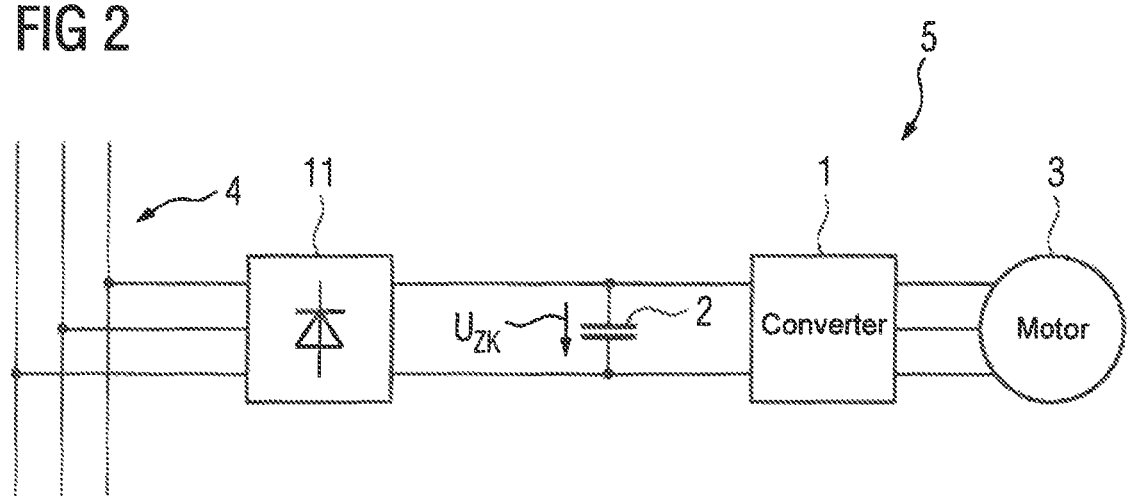
FIGS. 2 and 3 show an electric drive system in each case.

FIG. 2 shows a drive system 5 as a typical application for a controllable converter 1. In this case, the intermediate circuit with its intermediate circuit capacitor 2 is supplied with energy via a diode rectifier 11, also referred to as a diode bridge, from a power supply network 4. This energy is further transmitted via the controllable converter 1 to a motor 3 connected there. The controllable converter 1 can be used to control or regulate the behavior of the motor 3, in particular with respect to its torque or speed. The controllable converter 1 can be used to eliminate fluctuations in the intermediate circuit voltage $U_{ZK}$ by transmitting an additional power component $P_{add}$ to the motor 3. This additional power component $P_{add}$ then causes an additional torque in the motor 3. For a more precise description of the controllable converter, reference is made to the description for FIG. 1 and the reference symbols used there.

Figure 3:
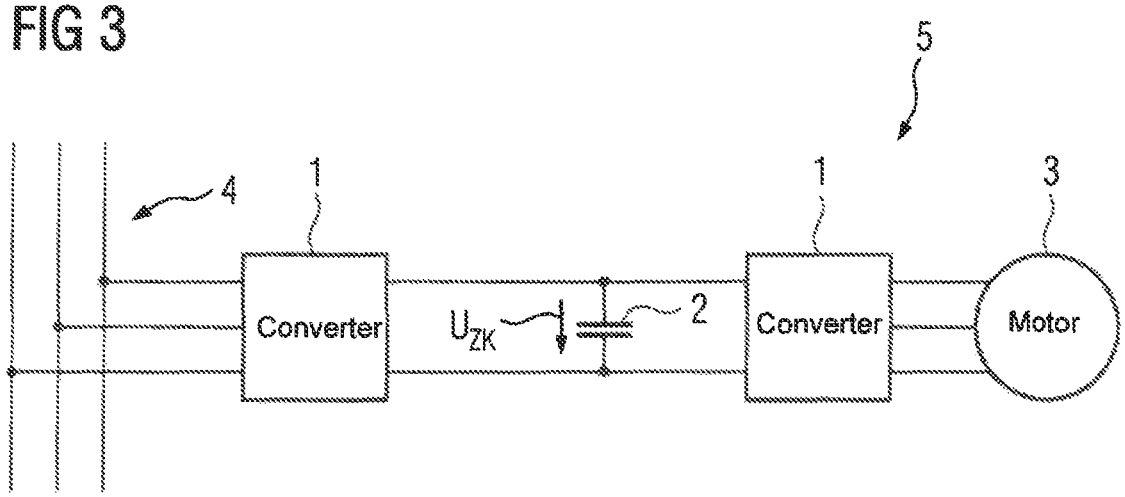

FIG. 3 shows a further exemplary embodiment of a drive system 5. To avoid repetition, reference is made to the description for FIG. 2 and the reference symbols used there. In contrast to the previous exemplary embodiment, a further controllable converter 1 is arranged here instead of the diode rectifier 11. The two controllable converters 1 that are now present now enable damping of the intermediate circuit voltage $U_{ZK}$ to be performed by both converters 1. Depending upon the distribution between the two converters 1, this then causes currents in the power supply network and an additional torque in the motor.

Figure 4:
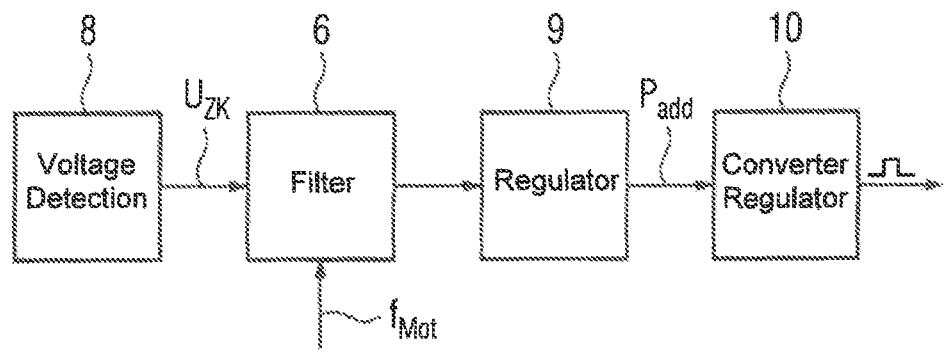
FIG. 4 shows a regulation diagram.

FIG. 4 shows a simplified regulation diagram for performing the method. Based on a voltage detection 8, the value of the intermediate circuit voltage $U_{ZK}$ is transmitted to a filter 6. In this case, the filter 6 can only transmit the intermediate circuit voltage $U_{ZK}$ in specific frequency ranges or filter out specific frequencies in order to improve the behavior of the method for eliminating voltage fluctuations. In this case, the frequencies can be fixed or obtained in dependence on the motor frequency.

Figure 5:
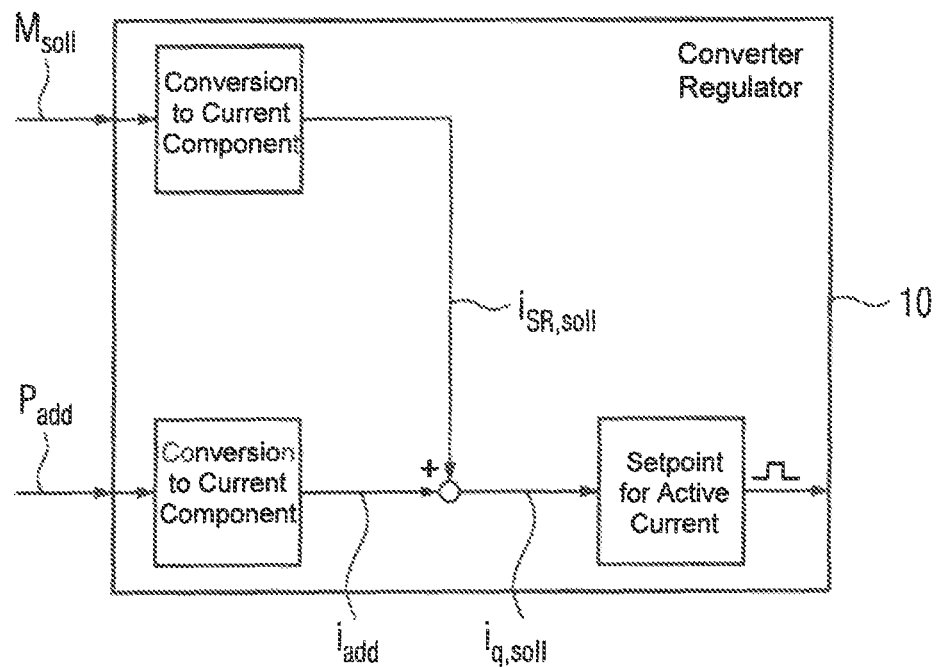
FIG. 5 shows a section of an active current regulator.

This filter 6 is an optional component of the regulator which can quite easily be dispensed with if the damping of the intermediate circuit voltage $U_{ZK}$ is to be damped over a wide band. Dispensing with the filter 6 enables the motor frequency $f_{Mot}$ and the intermediate circuit voltage $U_{ZK}$ to be fed directly to the regulator 9. The regulator 9 determines from the value of the intermediate circuit voltage $U_{ZK}$, directly or from the filtered signal, the additional power component $P_{add}$ to be transmitted by the controllable converter 1 to reduce or eliminate the voltage fluctuation at the intermediate circuit capacitor 2. The converter regulator 10 converts this information back into switching pulses for the semiconductors 7. In this case, the tasks of the regulator 9 and the converter regulator 10 can be combined in one hardware assembly for regulating the converter 1. Parts of the converter regulator 10 for controlling the active components of the current by the controllable converter 1 are shown in FIG. 5. Both the setpoint torque $M_{soll}$ for the motor 3 of the drive system 5 and the additional power component $P_{add}$ are converted into respective current components $i_{add}$, $i_{SR,soll}$. These current components are added together and produce the setpoint for the active current $i_{q,soll}$ within the converter regulator 10. The active current regulator is then converted in a known manner into control pulses for the semiconductors 7 of the controllable converter 1.

In summary, the invention relates to a method for operating a controllable converter with an intermediate circuit capacitor. To improve the controllable converter, in particular in respect of its regulation behavior, it is suggested that, in dependence on an intermediate circuit voltage applied to the intermediate circuit capacitor, an additional power component is transmitted via the controllable converter in such a way that the electric current produced for the additional power component counteracts oscillation of the intermediate circuit voltage by means of the controllable converter. The invention further relates to a controllable converter with a regulating unit for carrying out a method of this kind, wherein the controllable converter has semiconductors that can be switched off and an intermediate circuit capacitor, wherein the intermediate circuit capacitor is embodied as a film capacitor.

In other words, the invention relates to a method for operating a controllable converter with an intermediate circuit capacitor. To improve the controllable converter, in particular in respect of its regulation behavior, it is suggested that, in dependence on an intermediate circuit voltage applied to the intermediate circuit capacitor, an additional power component is transmitted via the controllable converter in such a way that the electric current produced for the additional power component counteracts oscillation of the intermediate circuit voltage by means of the controllable converter, wherein the additional power component is transmitted to the motor in the form of a pulsating additional torque by means of the controllable converter.

What is claimed is:

1. A method for operating a controllable converter connected to a motor and having an intermediate circuit capacitor embodied as a film capacitor, the method comprising:
transmitting via the controllable converter an additional power component in dependence on an intermediate circuit voltage of the intermediate circuit capacitor such that an electric current generated for the additional power component counteracts an oscillation of the intermediate circuit voltage only when a periodic oscillation of the intermediate circuit voltage is detected and when this periodic oscillation lies in a predetermined frequency range that includes a resonant frequency composed of the intermediate circuit capacitor and a motor inductance of the motor; and
transmitting the additional power component to the motor as a pulsating additional torque.

2. The method of claim 1, wherein a nominal voltage of the controllable converter is less than or equal to 1000 V.

3. The method of claim 1, wherein a nominal voltage of the controllable converter is equal to 400 V.

4. The method of claim 1, further comprising measuring the intermediate circuit voltage at the intermediate circuit capacitor or the current through the intermediate circuit capacitor to detect the periodic oscillation of the intermediate circuit voltage.

5. The method of claim 4, further comprising filtering the measured intermediate circuit voltage or the measured current.

6. A controllable converter comprising
semiconductors that can be switched off,
an intermediate circuit capacitor embodied as a film capacitor, and
a converter regulator controlling the semiconductors and configured to
transmit via the controllable converter an additional power component in dependence on an intermediate circuit voltage of the intermediate circuit capacitor such that an electric current generated for the additional power component counteracts an oscillation of the intermediate circuit voltage only when a periodic oscillation of the intermediate circuit voltage is detected and when this periodic oscillation lies in a predetermined frequency range that includes a resonant frequency composed of the intermediate circuit capacitor and a motor inductance of the motor, and
transmit the additional power component to the motor as a pulsating additional torque.

* * * * *